(12) United States Patent
Gneuss

(10) Patent No.: US 11,619,315 B1
(45) Date of Patent: Apr. 4, 2023

(54) SELF-CLOSING FLOW VALVE

(71) Applicant: Simon Elias Gneuss, Charlotte, NC (US)

(72) Inventor: Simon Elias Gneuss, Charlotte, NC (US)

( * ) Notice: Subject to any disclaimer, the term of this patent is extended or adjusted under 35 U.S.C. 154(b) by 45 days.

(21) Appl. No.: 17/495,527

(22) Filed: Oct. 6, 2021

(51) Int. Cl.
F16K 21/16 (2006.01)

(52) U.S. Cl.
CPC .................... *F16K 21/16* (2013.01)

(58) Field of Classification Search
CPC ........ F16K 21/04; F16K 21/16; F16K 31/055; F16K 47/01; F16K 3/02; F16K 3/08; F16K 3/10; F16K 21/10; F16K 21/12; F16K 1/22; F16K 5/0442; F16K 11/0836; F16K 11/0856; F16K 11/0873; F16K 31/12; F16K 31/041; F16K 31/1635; E03D 3/02; E03D 3/08; E03D 3/10
See application file for complete search history.

(56) References Cited

U.S. PATENT DOCUMENTS

| | | | | |
|---|---|---|---|---|
| 1,185,389 A | * | 5/1916 | Ferrer | ........................ E03D 3/10 137/595 |
| 1,231,828 A | * | 7/1917 | West | ........................ E03D 3/10 4/359 |
| 1,396,400 A | * | 11/1921 | Bresson | .................... E03D 3/10 4/363 |
| 4,577,829 A | | 3/1986 | Strangfeld | |
| 5,458,152 A | | 10/1995 | Goehner et al. | |
| 6,029,945 A | | 2/2000 | Blanke | |
| 6,769,577 B1 | | 8/2004 | Feierabend | |
| 8,756,858 B2 | | 6/2014 | Krabbendam et al. | |
| 2006/0037975 A1 | | 2/2006 | Suffa | |

FOREIGN PATENT DOCUMENTS

CA    2 656 106 C    1/2008

* cited by examiner

*Primary Examiner* — Daphne M Barry

(57) ABSTRACT

A valve body including an inlet pipe, an outlet pipe, a valve body, a flow channel formed in the valve body. A valve plug unit has a stem, a wing, and a plug arranged along a longitudinal access of the valve plug unit, the plug being arranged to be rotatable in a plug housing formed in the flow channel. A bypass inlet is arranged in the outlet pipe to facilitate fluid flow to and from the reservoir. A bypass outlet nozzle is arranged in a wall of the chamber, the bypass outlet nozzle configured and arranged such to direct a fluid jet stream at a surface of the wing that is fixedly connected to the stem of the valve plug unit to thereby rotate the wing from a first position to a second position, the bypass outlet nozzle being fluidically connected to the reservoir via a bypass.

10 Claims, 7 Drawing Sheets

SELF-CLOSING FLOW VALVE

BACKGROUND OF THE INVENTION

Field of the Invention

The present invention relates to the field of valves to allow a predetermined amount of fluid to flow through before being shut off.

Description of the Background Art

In the conventional art, when a certain amount of fluid must be consistently released, there needs to be an external mechanism to open and close the valve. For example, many toilets include a tank that holds the water until the flushing mechanism is initiated. A plug is lifted to release the water in the tank and then closes when all water has been voided. A fill valve refills the tank until it is closed by a ballcock. This design utilizes many moving parts which is undesirable for a mechanical device being used so often. Toilets without a tank use a mechanism of alternating high- and low-pressure chambers in the flush valve to open and close a diaphragm. This design is prone to leaking, inconsistent flushing, or not flushing at all.

Other hardware may use electronic flowmeters. These can utilize paddlewheels, ultrasonic signals, or turbines. However, they are expensive, and fixing them is difficult.

SUMMARY OF THE INVENTION

The present invention relates to a valve apparatus used for shutting off a flow of fluid after a predetermined amount has passed through.

In an exemplary embodiment, a valve apparatus is provided that includes a valve that can be manually opened but then closed without further action with minimal moving parts. This can be accomplished in a cost-efficient manner using a mechanical feature that operates under the same fluid pressure of the valve. This mechanical feature will be attached to a ball valve so it will open and close through rotation. By operating under the same fluid pressure as the valve, changes in fluid pressure won't change how much fluid is released. The actuation mechanism will work best with fluids of a low viscosity such as distilled water, milk, and blood. This valve will provide an inexpensive, reliable, and robust mechanism for valve actuation while not being prone to leakage.

The wheel can be a lever to allow for easier rotating of the valve from the closed position to the open position.

The reservoir can be adjustable by size to change the amount of fluid flowing through the valve before it is shut off.

The chamber can have a circular or polygonal shape containing sides of one or more to reduce the required space and material.

The wing can rotate between 0° and 90° to allow the valve to work with different actuation speeds and/or under different fluid pressures.

Thus, according to an exemplary embodiment, a valve body is provided that includes an inlet pipe, an outlet pipe, a valve body, a flow channel formed in the valve body, the flow channel facilitating fluid flow from the inlet pipe to the outlet pipe, and a chamber. A valve plug unit having a stem, a wing, and a plug, the plug being arranged along a longitudinal access of the valve plug unit, the plug being arranged to be rotatable in a plug housing formed in the flow channel, a rotation of the valve plug unit from a closed position to an open position facilitating fluid flow through the flow channel from the inlet pipe to the outlet pipe, the wing being rotatably arranged in the chamber, the chamber and the valve body being sealingly arranged from one another along the longitudinal axis of the valve plug unit. A reservoir arranged between the chamber and the outlet pipe. A bypass inlet arranged in the outlet pipe to facilitate fluid flow to and from the reservoir, and a bypass outlet nozzle arranged in a wall of the chamber, the bypass outlet nozzle configured and arranged such to direct a fluid jet stream at a surface of the wing that is fixedly connected to the stem of the valve plug unit to thereby rotate the wing from a first position to a second position, the bypass outlet nozzle being fluidically connected to the reservoir via a bypass.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limited of the present invention, and wherein.

DETAILED DESCRIPTION OF THE INVENTION

Figure 1:
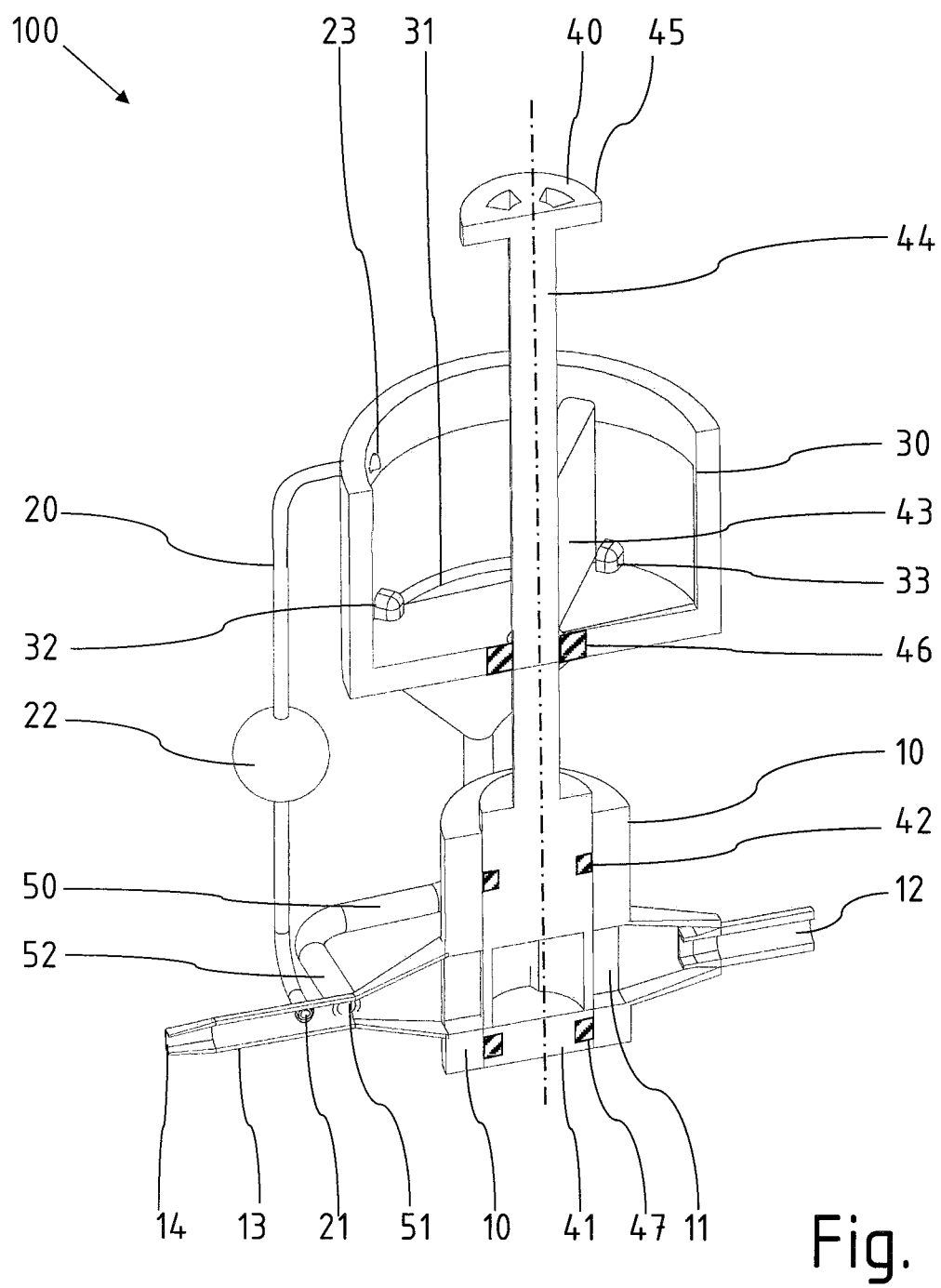
FIG. 1 shows a sectional view of a self-closing valve in the closed position.

FIG. 1 shows a valve body 10 having an inlet pipe 12 and an outlet pipe 13, arranged on opposite horizontal ends of a flow channel 11. The inlet pipe 12 and outlet pipe 13 are of a hollow shape with any number of sides, faces, and arcs. The inlet pipe 12 and outlet pipe 13 contain open ends which connect to the flow channel 11. This allows fluid to freely flow between the parts.

The flow channel 11 is a hollow section inside a plug 41 and the plug 41 housing which fluidically connects the inlet pipe 12 and outlet pipe 13. The flow channel 11 is shut off by a plug 41 so fluid cannot flow between the inlet pipe 12 and the outlet pipe. The plug 41 is fitted inside a housing for vertical axis rotation. The plug 41 and the housing can be of a cylindrical, ovoidal, or spherical shape. It is desirable to use a housing of the same shape as the plug 41. The plug 41 is made up of a solid center and the housing contains a hollow center. This allows the plug 41 to be arranged inside the housing. The plug 41 contains a cut out section extending from one horizontal end to the other horizontal end. The cut-out section of the plug 41 forms the center of the flow channel 11. The plug 41 housing contains two holes on opposing horizontal ends that forms the ends of the flow channel 11. Together, the cut-out section of the plug 41 and the holes in the plug 41 housing form the entirety of the flow channel 11 when they are aligned. The maximum amount of fluid will be able to flow through an aligned flow channel 11. The flow channel 11 will only be aligned when the plug 41 is rotated between 0° and 10°. At all other angles, the plug 41 will imperfectly or not at all align the flow channel 11. If the plug 41 and the housing are of a spherical shape, rotation around all axes will be possible but only vertical axis rotation will be used. The flow channel 11 can be arranged at any height so long as it is flush with the inlet pipe 12 and outlet pipe between 0° and 10°. The flow channel 11 should also have equal square units of area for the width and height as the inlet pipe 12 and outlet pipe 13 so pressure in the flow channel 11 is equal to the pressure in the inlet pipe 12 and outlet pipe 13.

Seal bearings 42, 47, above and below the flow channel 11, are arranged horizontally and between the plug 41 and the housing. The seal bearings 42, 47 can be arranged at any height above or below the cut-out section of the plug 41 but cannot exceed the highest or lowest point where the housing and plug 41 are in contact with each other. Seal bearing 42 is arranged directly above the flow channel 11 and seal bearing 47 is arranged directly below the flow channel 11. The outer race of the seal bearings 42, 47 is in fixed contact with the housing and the inner race of the seal bearings 42, 47 is in fixed contact with the plug 41. Balls or rollers between the inner race and outer race of the seal bearings 42, 47 allow for vertical axis rotation with reduced friction between the plug 41 and the housing. A lip seal on the seal bearings 42, 47 will prevent fluid from leaking out of the flow channel 11. The seal bearings 42, 47, restrict all relative movement between the plug 41 and housing other than rotation around the vertical axis of the plug 41 while the housing stays fixed.

The plug 41 is a subpart of the larger valve plug unit 40. A stem 44 is of a solid cylindrical shape and extends upwards from the plug 41. The plug 41 housing has an open top allowing the stem 44 to extend away from the plug 41. The stem 44 extends into a chamber 30 of a hollow cylindrical shape multiple times wider than the stem 44 through a cylindrical hole in the chamber 30 floor. The stem 44 fits concentrically inside the chamber 30. The chamber 30 can be of any hollow shape that uses one or more sides, faces and arcs, but a hollow cylinder will be most desirable as any other shape will use unnecessary material. A wheel 45 is at the end of the stem to manually rotate the valve plug unit 40 or can be rotated via an actuator, drive motor, etc. The wheel 45 is a torus with a direct connection to the top of the stem 44 but can also be a lever. Any shape that can directly connect to the stem 44 for direct rotation is a suitable shape for the wheel 45. A seal bearing 46 connects the stem to the chamber 30. The seal bearing 46 is arranged horizontally and between the stem 44 and the chamber 30 floor. The outer race of the seal bearing 46 is in fixed contact with the chamber 30 floor and the inner race of the seal bearing 46 is in fixed contact with the stem. Balls or rollers between the inner race and the outer race allow the stem to rotate with reduced friction with the chamber 30 floor. The seal bearing 46 constrains the relative movement between the chamber 30 and stem 44 to only rotation around the vertical axis of the stem 44. A lip seal on the seal bearing 46 prevents fluid from flowing between the stem 44 and chamber 30. Inside the chamber 30, a wing 43 extends out perpendicularly from the stem 44 to the inner chamber 30 wall. All subparts of the valve plug unit 40 are directly connected so rotation of one subunit will directly lead to equal rotation of all other subunits.

Stoppers 32-33 inside the chamber constrain the wing 43 from rotating past, for example, 90°. The stoppers 32-33 may be raised sections of the chamber 30 floor. In this case, the stoppers 32-33, may be located at any distance from the stem 44 and the chamber 30 wall. The stoppers 32-33 can also extend up to any height within the chamber 30. The stoppers 32-33 can also extend out from the chamber 30 wall towards the stem 44 at any length. If the stopper 32-33 were to extend out from the chamber 30 wall, they can be located at any distance between the bottom and top of the chamber 30 so long as the stoppers 32-33 constrain the rotation of the wing between 0° and 90°. In the above cases, the stoppers 32-33 directly block the wing 43. The stoppers 32-33 can also directly block the stem 44 from rotating. The stem 44 can have 90° arcs cut out from the outside extending towards the center up to any height. The stoppers 32-33 can be arranged within the cut-out arcs of the stem 44 and when the valve plug unit 40 rotates to 90°, the end of the arc will come into contact with the stopper 33 and be prevented from rotating further.

In FIG. 1. the wing is in contact with stopper 33 and the valve plug unit is rotated at 90°. Provided that stopper 32 is a raised section of the chamber 30 floor and arranged in the corner of the chamber 30 wall and the chamber 30 floor, stopper 32 is located directly under a bypass outlet nozzle 23. Stopper 32 and the bypass outlet nozzle 23 represent 0° in the chamber. The bypass outlet nozzle 23 is a subpart of a larger bypass 20. The bypass 20 serves to transport fluid from the outlet pipe 13 into the chamber 30. The bypass outlet nozzle 23 enters the chamber through a hole, for example, in the upper third of the chamber 30 wall. The bypass outlet nozzle 23 may also be at the same level as the top of the wing 43, and should be positioned such that the bypass outlet nozzle 23 allows fluid to be directed at a face of the wing 43. The bypass 20 begins with a bypass inlet 21 which is connected to the outlet pipe 13 allowing fluid to flow between them. The bypass inlet 21 is an open-ended hollow pipe to allow fluid to freely flow in, out, and through it in both directions. Between the bypass inlet 21 and the bypass outlet nozzle 23, there is a reservoir 22. The reservoir 22 can have any hollow shape with any number of sides, faces, or arcs and with holes on opposite sides extending from the solid outside to the hollow inside. The holes in the reservoir 22 are aligned with one end of the bypass inlet 21 and one end of the bypass outlet nozzle to allow fluid to freely flow between the bypass inlet 21 and the bypass outlet nozzle 23. It is desirable to arrange the holes in the reservoir 22 on the vertical ends to use the least amount of material and provide the most direct path between the bypass inlet 21 and the bypass outlet nozzle 23.

The chamber 30 floor contains a drain opening 31 between the stoppers 32-33 and under the rotation arc of the wing 43. The drain opening 31 allows fluid to exit the chamber 30 by the force of gravity. The drain opening 31 connects to a drain tube 50. The drain tube 50 ends in a drain tube outlet 51. The drain tube 50 is hollow and changes shape as the distance from the drain opening 31 increases. At the drain opening 31, starting in the shape of the drain opening, the drain tube outlet 51 enters the outlet pipe 13 through a hole in the side of the outlet pipe. The edges of the hole in the outlet pipe 13 are solidly connected to the drain tube outlet 51 to not allow any fluid between them. The drain opening 31, drain tube 50, and drain tube outlet 51 function to move fluid from inside the chamber 30 to the outlet pipe 13. A check valve 52 upstream of the drain tube outlet 51 functions to prevent fluid from flowing into the drain tube 50 from the outlet pipe 13 when under pressure.

The check valve 52 may work by a disk that rotates in the direction of the intended flow outlet by a hinge joint. When the disk in the check valve 52 is perpendicular in relation to the direction of the flow, a seat blocks the disk from rotating further. Also, when the disk is perpendicular in relation to the flow direction, it completely blocks all fluid flow through the valve. This way, when fluid is under pressure in the intended direction of the flow, the disk can rotate away from the seat and fluid can flow through the valve. When fluid is under pressure in the unintended direction in the valve, the disk will rotate back toward the seat until it completely blocks all fluid flow. Inside the drain tube outlet 51, the disk of the check valve 52 will rotate towards the outlet pipe 13. This way, when there is pressure inside the outlet pipe 13, the disk will block all fluid from entering the drain tube 50.

In FIG. 1. fluid cannot pass through the valve when in a closed position due to the plug 41 blocking the flow channel 11. Fluid can enter the inlet pipe 12 but all other sections remain void of fluid.

Figure 2:
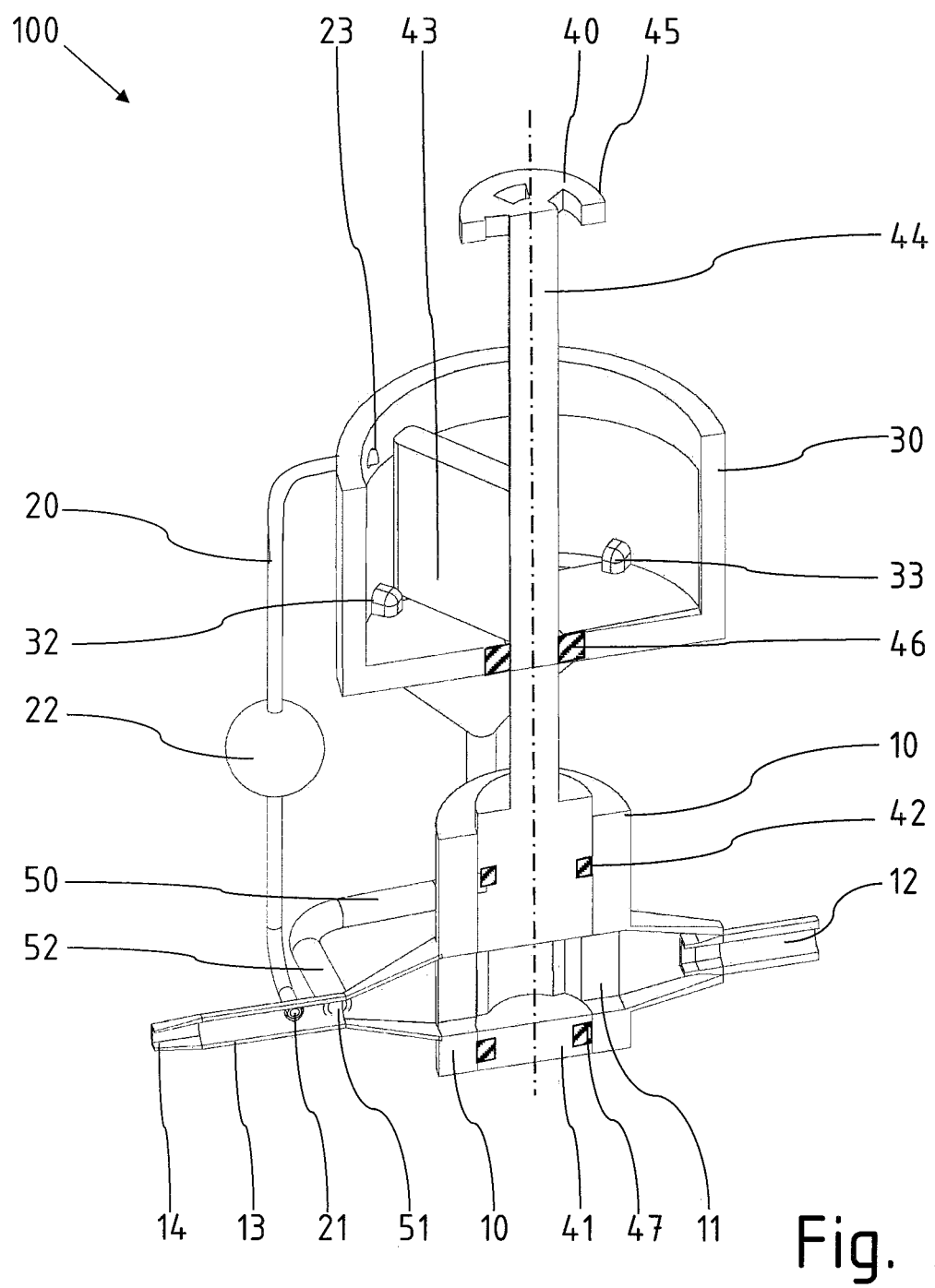
FIG. 2 shows a sectional view of a self-closing valve in the open position.

FIG. 2 shows all features unchanged but with a different rotation of the valve plug unit 40. The wheel 45 rotates -90° and the wing 43 hits the stopper 32. By rotating the wheel 40, the entire valve plug unit 40, which includes the plug 41, also rotate. The flow channel 11 becomes aligned allowing maximum fluid to flow from the inlet pipe 12 to the outlet pipe 13.

After fluid flows through the flow channel 11, an amount of less than 50% of fluid will be diverted to the bypass inlet 21 through a hole in the side of the outlet pipe 13. The hole in the outlet pipe 13 can be arranged at any distance from the flow channel and at any height. The bypass inlet 21 is smaller than the outlet pipe 13 allowing more fluid to exit the valve than be diverted. Non-diverted fluid will continue to flow through the outlet pipe 13. At the end of the outlet pipe 13, there is a flow restrictor 14. The flow restrictor 14 is a pipe with fewer square units of area regarding the height and width then the outlet pipe 13. This increases the pressure in the outlet pipe 13 to force fluid up the bypass 20 against the force of gravity. The flow restrictor 14 should increase the pressure in the outlet pipe 13 enough to force fluid against the force of gravity up the bypass 20 but not so much to where cavitation occurs in the reservoir 22 or chamber 30. The diverted fluid will first fill a reservoir 22 and then continue to the bypass outlet nozzle 23. The fluid will then exit the bypass outlet nozzle 23 into the chamber 30. The fluid exiting the bypass outlet nozzle 23, which is sized such that the exiting fluid will resemble, for example a forceful stream or jet that is directed towards the wing 43. When the fluid first exits the bypass outlet nozzle 23, the top half of the wing 43 is positioned closest to the bypass outlet nozzle 23. This means the fluid exiting the bypass outlet nozzle 23 will hit the wing 43 with maximum force. The pressurized fluid exiting the bypass outlet nozzle 23 will apply force against the wing 43 and cause the entire valve plug unit 40 to quickly, almost instantaneously rotate until the wing 43 hits the stopper 33 and thereby the plug 41 is positioned again to completely block the flow channel 11 as in FIG. 1. At this point, the valve is back in its closed position and fluid no longer flows through it, also stopping the flow through the bypass 20.

Figure 6:
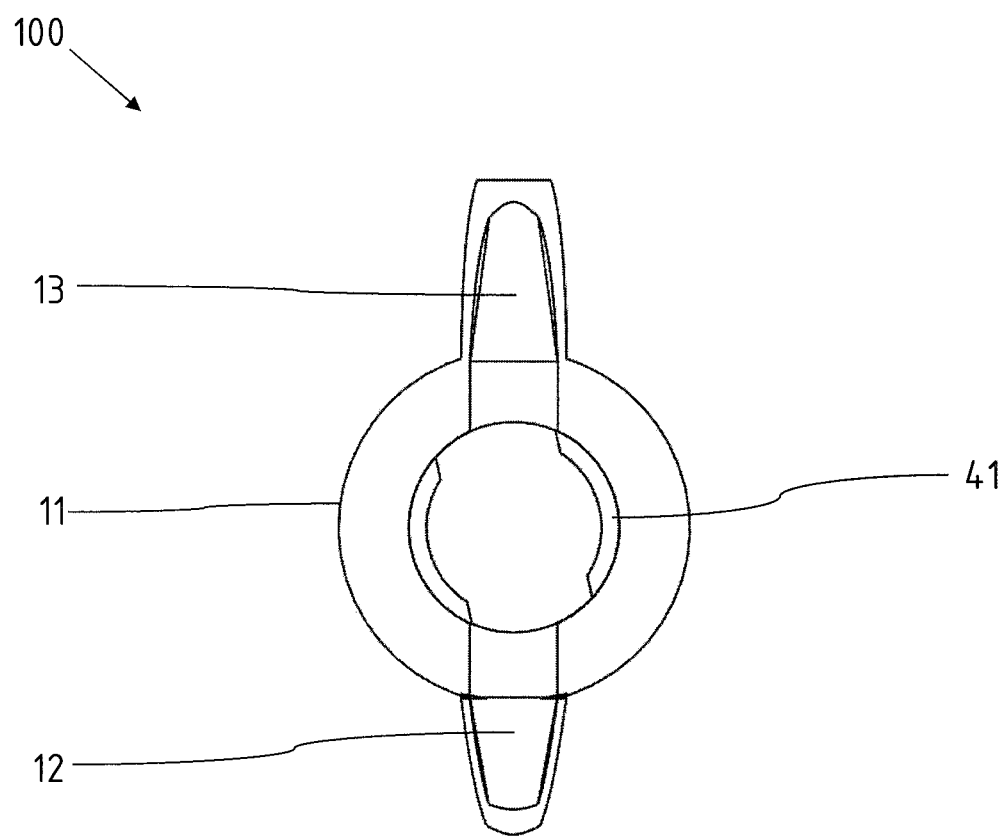
FIG. 6 shows a sectional view of a flow channel in a self-closing valve in the open position.
Figure 7:
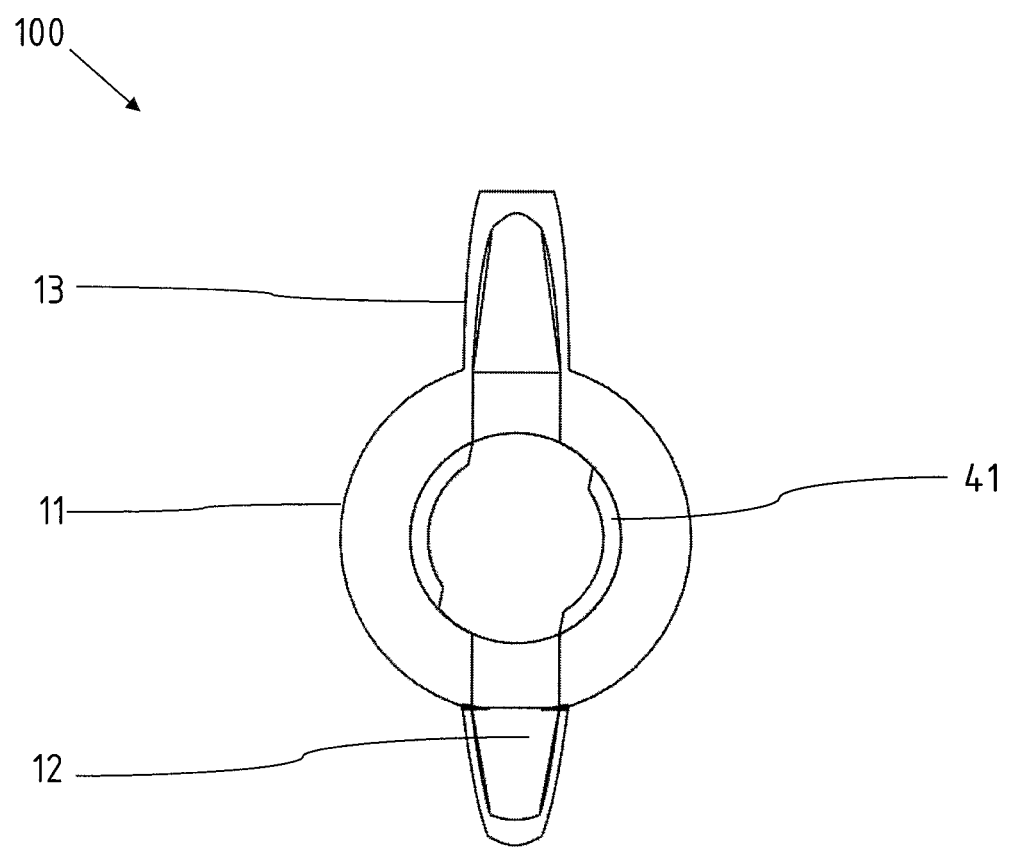
FIG. 7 shows a sectional view of a flow channel in a self-closing valve rotated to 10°.

As the plug 41 rotates past 10°, the flow channel 11 will be imperfectly aligned and maximum fluid will not flow through the flow channel 11. Therefore, the fluid pressure in the flow channel 11 and outlet pipe 13 will decrease as the plug 41 continues to rotate past 10° and the fluid will exit the bypass outlet nozzle 31 with decreased force. To prevent the valve plug unit 40 from getting stuck while the flow channel 11 is imperfectly aligned, FIG. 6 and FIG. 7 show that the plug 41 can rotate 10° while the flow channel 11 stays perfectly aligned. This means that the plug 41 will be able to rotate 10° while the fluid exiting the bypass outlet nozzle 23 is still under the maximum pressure in the inlet pipe 12. This gives the valve plug unit 40 the ability to build up rotation momentum before the pressure of the fluid exiting the bypass outlet nozzle 23 decreases. The additional momentum gathered in the valve plug unit 40 during the first 10 degrees will aid in continuing and completing the rotation of the valve plug unit 40, acting as a safeguard against the wing 43 ceasing rotation before coming into contact with stopper 33. The seal bearings 42, 46-47, will also allow the valve plug unit 40 to rotate with little friction against the valve body 10 or the chamber 30. This allows the rotation of the valve plug unit 40 to be quick, limiting the time that the valve plug unit 40 is rotating with decreased fluid pressure in the outlet pipe. The momentum of the valve plug unit 40 and the speed of actuation will safeguard against the wing 43 being stuck in the middle of stoppers 32-33. The wing 43 and the stoppers 32-33 may be made from a soft material that will not produce a lot of sound when they come into contact with each other and will absorb the impact so as not to bounce.

Figure 3:
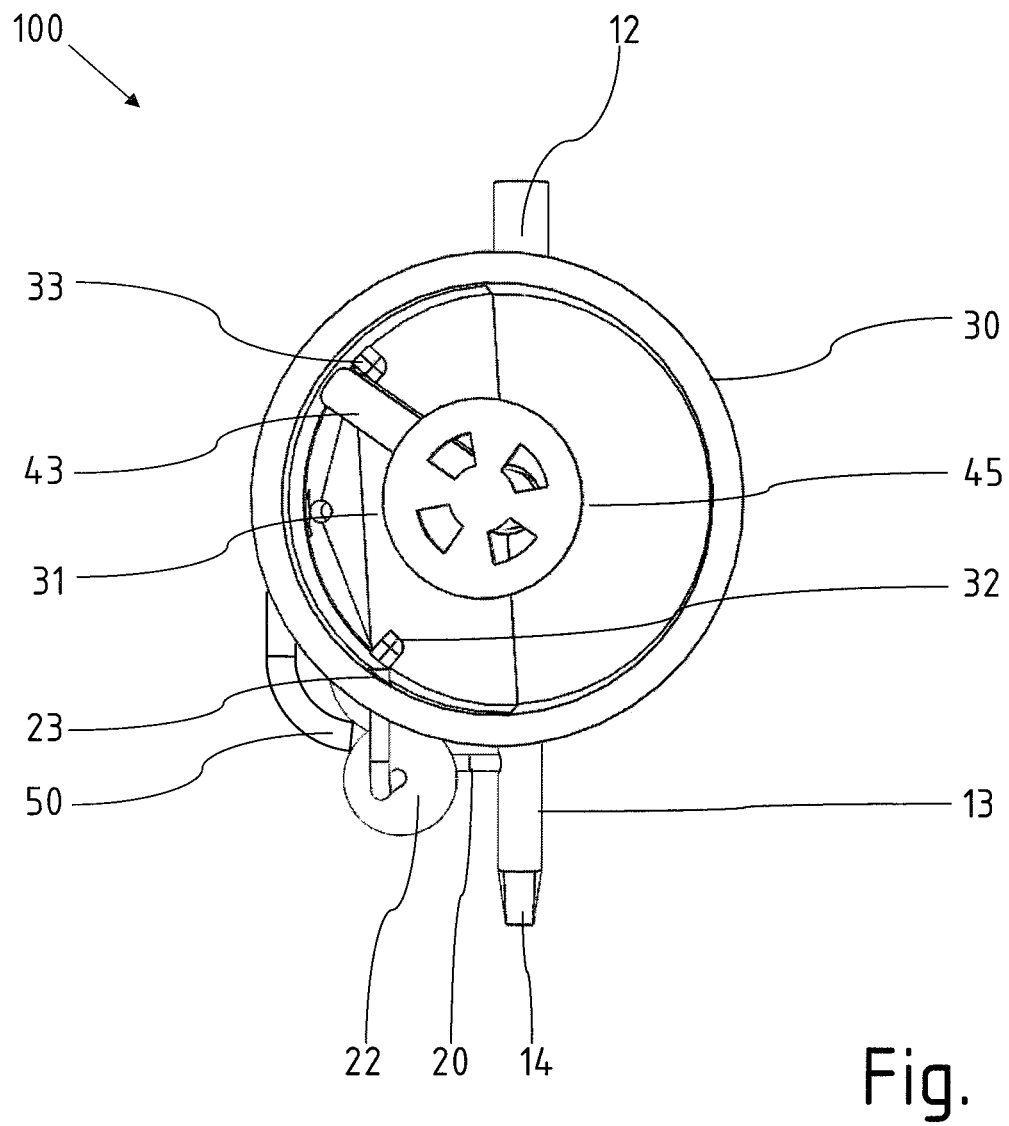
FIG. 3 shows a top view of a self-closing valve in the closed position.
Figure 4:
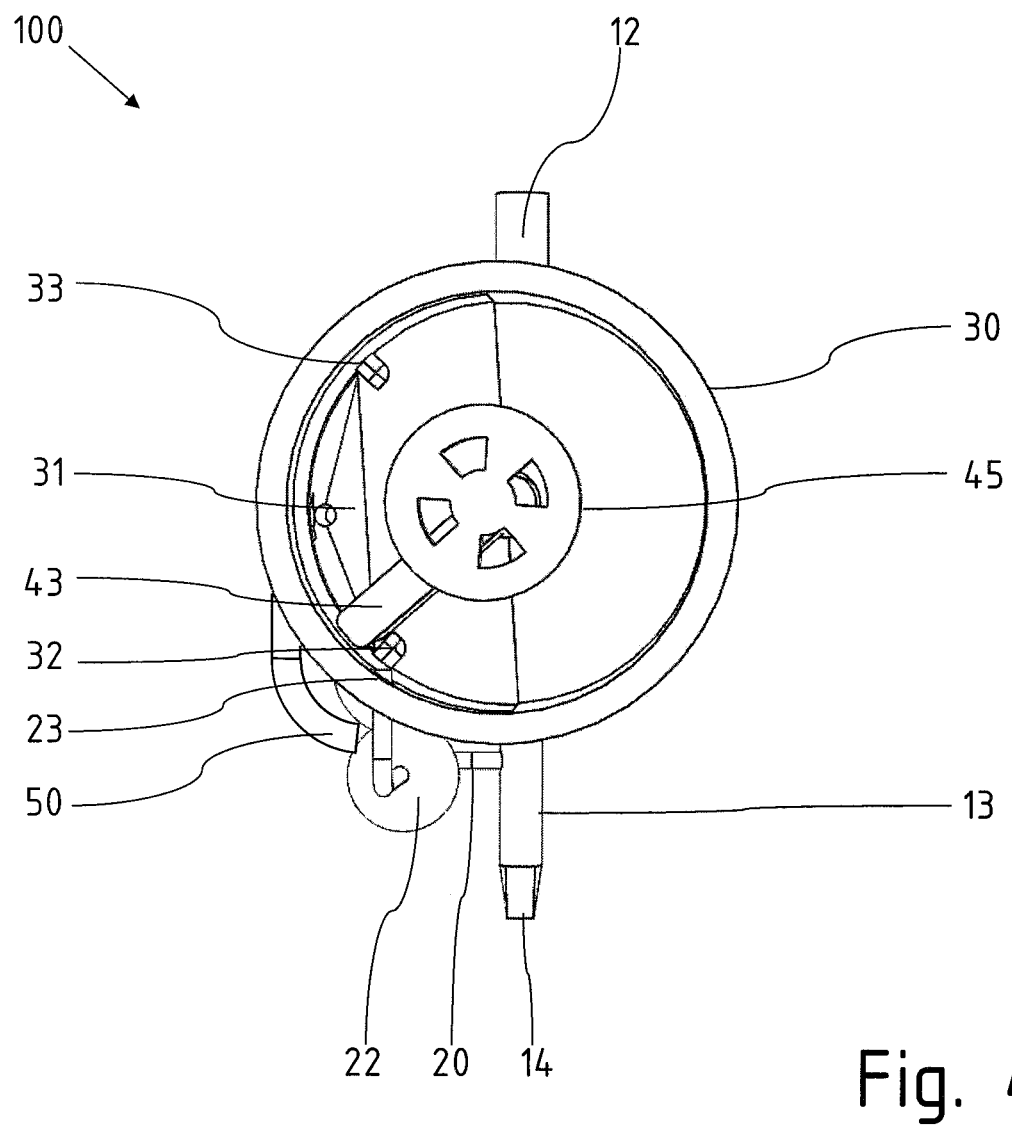
FIG. 4 shows a top view of a self-closing valve in the open position.

FIG. 3 and FIG. 4 show top views of the chamber 30. Fluid inside the chamber will exit through the drain opening 31 into the drain tube 50. This top view shows the positioning of the drain opening 31 is advantageous because the fluid being projected at the wing 43 can be drained most efficiently when the drain opening 31 is always directly under the wing 43. Once fluid hits the wing 43, gravity will pull the fluid down into the drain opening 31. Since fluid on the chamber 30 floor will also create resistance for the wing 43, the wing 43 will be raised above the floor of the chamber 30 to allow fluid to be on the chamber 30 floor without slowing the rotation of the wing 43. The chamber 30 floor will also be lower on the side with the drain opening 31 than on the side without the drain opening 31. This will give the chamber 30 floor a gradient and will allow the fluid to flow towards the drain opening 31 by the force of gravity from any position on the floor of the chamber 30. Only when the flow channel 11 is completely closed, will the fluid be able to move through the check valve 52. With pressure from the fluid in the drain tube 50 caused by gravity pulling the fluid down and a lack of pressure in the outlet pipe 13, the disk in the check valve 52 will rotate towards the outlet pipe 13 and all fluid in the drain tube 50 will be voided. Therefore, it would be desirable if the drain tube 50 has enough hollow volume to hold all the fluid exiting the bypass outlet nozzle 23 during one actuation cycle.

The reservoir 22 serves to provide a delay between when fluid enters the bypass inlet 21 and when the fluid exits the bypass outlet nozzle 23 to rotate the plug 41 to block the flow channel 11. The size of the reservoir 22 is adjustable to allow for various actuation speeds. With a larger reservoir 22, it will take longer for fluid to move through the bypass 20 and out of the bypass outlet nozzle 23. This way, a relatively high volume of fluid will have passed through the outlet pipe 13 before the force of the fluid on the wing 43 closes the flow channel 11. With a smaller reservoir 22, fluid will reach the bypass outlet nozzle 23 quicker. This way, a relatively low volume of fluid will have passed through the outlet pipe 13 before the force of the fluid on the wing 43 closes the flow channel 11. The amount of fluid flowing through the valve will also be determined by the size of the reservoir 22. The fluid inside the bypass 20, the fluid that exits the flow restrictor 14, and any fluid inside the chamber 30 or drain tube 50 will make up the total fluid that passes through the valve. Therefore, the total volume of fluid is adjustable based, in particular, on variable sizing of the reservoir 22.

Figure 5:
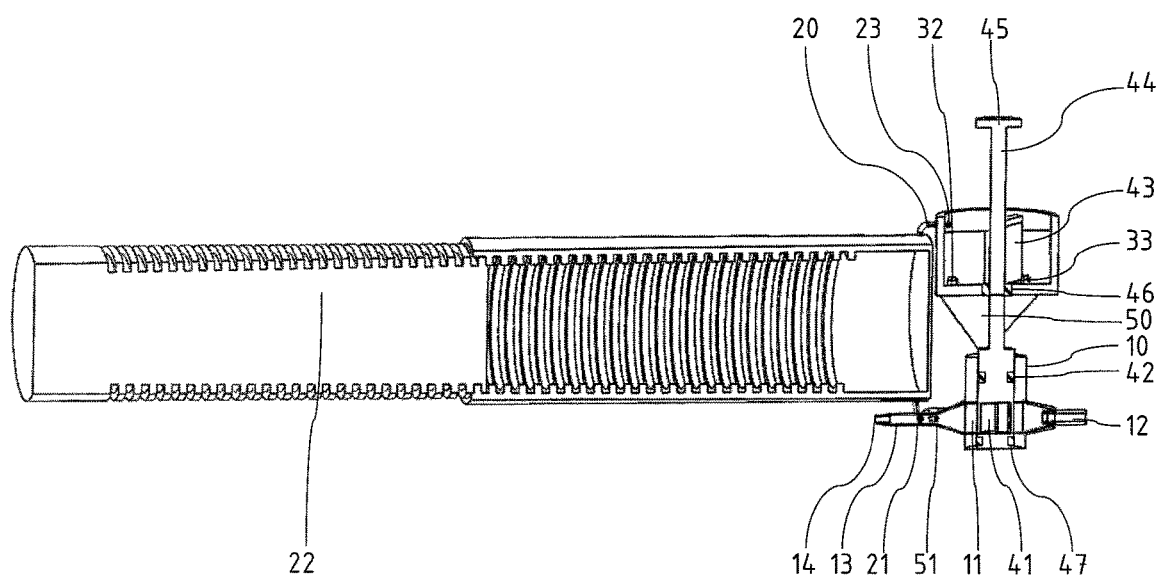
FIG. 5 shows a sectional view of a self-closing valve with a reservoir with a significantly larger possible fluid holding volume adjustable by a screw.

FIG. 5 shows a cross section of the reservoir. The reservoir 22 can be of any hollow shape with any number of sides, face, and arcs. Any part of the reservoir 22 should be above the inlet of the reservoir 22. After the flow channel 11 has been closed, all fluid inside the reservoir 22 will need to drain out and that cannot happen if fluid is below the entrance to the reservoir 22. FIG. 4 shows the reservoir 22 being adjustable using a screw with any thread pitch and thread spacing. By unscrewing, the reservoir 22 can hold more fluid and by screwing in, the reservoir 22 can hold less fluid. The reservoir 22 screw should not allow fluid to pass through the threads. The reservoir 22 can also be adjustable by replacement with a differently sized reservoir 22. In this case, there would need to be a mechanical fastener on both ends of the reservoir 22 to connect it to the bypass inlet 20 and bypass outlet nozzle 23. The mechanical fastener would need to be disengaged, the smaller or larger reservoir 22 be put into place with the holes in the new reservoir 22 aligned with one end of the bypass inlet and one end of the bypass outlet nozzle 23. The mechanical fastener would then be reengaged to reestablish a seal between the bypass inlet 21 and the reservoir 22 and between the bypass outlet nozzle and the reservoir. The reservoir 22 can also be adjustable using dividers. The dividers are plates or disks that can be arranged in slots inside the reservoir 22. When the dividers are completely lowered, they will form a complete seal and not allow fluid to pass it. The dividers can be manually lifted off the bottom of the reservoir but will not be completely removed from the reservoir 22. When a divider is lifted, fluid can flow under it and occupy the extra space until the next divider. The dividers should make a seal with the wall of the reservoir 22 so no fluid leaks out. The dividers can be lifted in the order of whichever divider is closest to the reservoir 22 inlet. The use of dividers will not provide continuous adjustability but rather an adjustability by intervals.

After the flow channel 11 has been closed and fluid pressure in the inlet pipe 12 is no longer exerting pressure in the outlet pipe 13, all fluid in the bypass 20 will drain into the outlet pipe 13. This will allow the bypass 20 and reservoir 22 to provide the same actuation delay when the valve gets opened again as it did the previous time.

This design allows the same amount of fluid to always come out of the outlet pipe 13. Fluid moving through the pipes, will always travel through the bypass 20 before being projected at the wing 43 at the same speed relative to the fluid exiting the outlet pipe 13. Under relatively high pressures, fluid will exit the outlet pipe 13 faster but will also be projected at the wing 43 faster and with more force closing the flow channel 11 faster. Under relatively low pressures, fluid will exit the outlet pipe 13 slower but will also take longer to be projected at the wing 43 giving more time for fluid to exit the outlet pipe 13. This way, the self-closing valve unit 100 can be moved from one application to another with the same fluid viscosity but different pressures and still release the same amount of fluid.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A valve body comprising:
   an inlet pipe;
   an outlet pipe;
   a valve body;
   a flow channel formed in the valve body, the flow channel facilitating fluid flow from the inlet pipe to the outlet pipe;
   a chamber;
   a valve plug unit having a stem, a wing, and a plug, the plug being arranged along a longitudinal axis of the valve plug unit, the plug being arranged to be rotatable in a plug housing formed in the flow channel, a rotation of the valve plug unit from a closed position to an open position facilitating fluid flow through the flow channel from the inlet pipe to the outlet pipe, the wing being rotatably arranged in the chamber, the chamber and the valve body being sealingly arranged from one another along the longitudinal axis of the valve plug unit;
   a reservoir arranged between the chamber and the outlet pipe;
   a bypass inlet arranged in the outlet pipe to facilitate the fluid flow to and from the reservoir; and
   a bypass outlet nozzle arranged in a wall of the chamber, the bypass outlet nozzle configured and arranged such to direct a fluid jet stream at a surface of the wing that is fixedly connected to the stem of the valve plug unit to thereby rotate the wing from a first position to a second position, the bypass outlet nozzle being fluidically connected to the reservoir via a bypass.

2. The valve body according to claim 1, wherein a first stopper and a second stopper is arranged in the chamber to thereby delimit the rotation of the wing between the first position and the second position.

3. The valve body according to claim 1, wherein the chamber and the valve body are sealingly arranged from one another via a first seal bearing arranged within the chamber and a second seal bearing arranged within the valve body.

4. The valve body according to claim 1, further comprising a flow restrictor arranged at an exit of the outlet pipe.

5. The valve body according to claim 4, wherein the flow restrictor is sized such so as to allow fluid to be diverted through the bypass inlet and into the reservoir when the plug is in the open position.

6. The valve body according to claim 1, further comprising a drain opening formed between the first stopper and the second stopper on a floor of the chamber.

7. The valve body according to claim 6, further comprising a drain tube arranged such to fluidically connect the drain opening with a drain tube outlet, which is arranged on the outlet pipe.

8. The valve body according to claim 7, wherein a check valve is arranged between the drain tube outlet and the drain opening in the chamber to prevent fluid flow from the outlet pipe into the chamber.

9. The valve body according to claim 1, wherein the reservoir and the flow restrictor are sized such to allow a predetermined volume of fluid to flow out of the outlet pipe.

10. The valve body according to claim 1, wherein the valve body is moved from the closed position to the open position via a manual rotation of the valve plug unit.

\* \* \* \* \*